(12) United States Patent
Israni et al.

(10) Patent No.: US 12,259,284 B2
(45) Date of Patent: Mar. 25, 2025

(54) TEMPERATURE CONTROL USING APPLIED ELECTROMAGNETIC FIELDS

(71) Applicant: PRAXAIR TECHNOLOGY, INC., Danbury, CT (US)

(72) Inventors: Sameer H. Israni, Darien, IL (US); Xiaotang Du, Countryside, IL (US); Soujanya N. Jampala, Chicago, IL (US); John M. Girard, Downers Grove, IL (US); Keqin Zhou, Seminole, FL (US)

(73) Assignee: Praxair Technology, Inc., Danbury, CT (US)

( * ) Notice: Subject to any disclaimer, the term of this patent is extended or adjusted under 35 U.S.C. 154(b) by 516 days.

(21) Appl. No.: 17/632,602

(22) PCT Filed: Aug. 13, 2020

(86) PCT No.: PCT/US2020/046140
§ 371 (c)(1),
(2) Date: Feb. 3, 2022

(87) PCT Pub. No.: WO2021/034596
PCT Pub. Date: Feb. 25, 2021

(65) Prior Publication Data
US 2022/0276101 A1    Sep. 1, 2022

Related U.S. Application Data

(60) Provisional application No. 62/887,849, filed on Aug. 16, 2019.

(51) Int. Cl.
*G01K 7/36* (2006.01)
*F25D 3/00* (2006.01)

(52) U.S. Cl.
CPC ............... *G01K 7/36* (2013.01); *F25D 3/005* (2013.01); *G01K 2207/04* (2013.01)

(58) Field of Classification Search
CPC ........ G01K 7/36; G01K 7/38; G01K 2207/04; G01K 2207/06; F25D 3/005
See application file for complete search history.

(56) References Cited

U.S. PATENT DOCUMENTS

| 4,095,469 A * | 6/1978 | Yamada | G01K 7/36 |
| | | | 324/225 |
| 5,189,366 A | 2/1993 | Mayo | |
| 11,376,765 B1 * | 7/2022 | Chen Mazumdar | G01N 25/20 |
| 2007/0188372 A1 | 8/2007 | Leath | |
| 2012/0237644 A1 | 9/2012 | Luckhardt et al. | |
| 2017/0138661 A1 | 5/2017 | Newman et al. | |
| 2018/0164209 A1 | 6/2018 | Stiens et al. | |
| 2020/0333498 A1 * | 10/2020 | Zhao | G01V 3/10 |
| 2021/0181037 A1 * | 6/2021 | Izenson | G01K 11/24 |

FOREIGN PATENT DOCUMENTS

EP        3101420 A1 * 12/2016 ......... G01N 21/3554

* cited by examiner

*Primary Examiner* — Marc E Norman
(74) *Attorney, Agent, or Firm* — Andrew G. Melick

(57) ABSTRACT

Disclosed is a technique for characterizing a product utilizing novel measurements based on the reactive and resistive signals exhibited by the product in an electromagnetic field.

35 Claims, 5 Drawing Sheets

○ FOOD ITEMS OF DIFFERENT DIMENSION/SIZE/SHAPE
AT TEMP = $T_{SET} - \delta$

□ AT TEMP = $T_{SET}$

* AT TEMP = $T_{SET} + \delta$ $\delta$ = TEMPERATURE ACCURACY

TEMPERATURE CONTROL USING APPLIED ELECTROMAGNETIC FIELDS

RELATED APPLICATIONS

This application claims the benefit of International Application No. PCT/US2020046140, filed on Aug. 13, 2020, which claimed the benefit of U.S. Provisional Application Ser. No. 62/887,849, filed on Aug. 16, 2019, both of which are incorporated herein by reference.

FIELD OF THE INVENTION

The present invention relates to noninvasive and noncontact methodology that can be used to determine the temperature of products, and to determine the degree of freezing of products, such as food products. The present invention also relates to application of this methodology to controlling equipment such as equipment used for cooling and freezing, and to equipment with which this methodology can be implemented to control operation of the equipment.

BACKGROUND OF THE INVENTION

In many fields, the ability to determine temperature of an object or of a group of objects is important. This ability is useful for many reasons, such as maintaining or controlling the condition to which a product is exposed. Traditionally, the temperature of an object can be measured by directly contacting the object with a thermometer or with a contact that is attached to a thermocouple. However, in many situations such as in the food industry, methods that do not require contact with the product and that are noninvasive would be preferable, but only if such methods could be found that are practical and reliable. Noncontact methods such as techniques using infrared temperature sensors are known for use in this field, but they have many drawbacks. In general, infrared sensors provide a reading only for the temperature of a surface spot of an item, not for the larger surface or volume of the item. Also, the measurement accuracy depends on the actual measured spot size and measuring distance, and even if all else being equal, the accuracy is typically no better than 3-4 degrees F. for the relatively small target spot. Smaller target areas relative to distance result in less accurate measurement. The temperature from measured surface element to surface element of the item often varies (top, bottom, edges, center, etc.). In addition, if the item is going through phase change as in a freezing process, small changes in temperature can mean a large change in degree of freezing. In the frequent situations where the measured object has internal temperature variations, infrared temperature sensors cannot detect the internal or average temperature reliably. For example, during a continuous freezing process, there is a temperature gradient inside the food with the surface much colder than the core of the product. The product may take some time after it exits the freezer for the internal temperature gradients to disappear and the entire product to reach an equilibrated temperature. So, measuring the surface temperature at the exit of the freezer is not very useful as it does not correlate well with the final equilibrated temperature. On the other hand, when a temperature probe is inserted into a product with internal temperature gradients, small variations in the depth of penetration can result in significant inaccuracies.

US published patent application 2012/0237644 describes a method for controlling a cooking process based on measuring the electric impedance of food items during cooking. The sensor probe is inserted into food items for impedance measurement, which will dent, alter, damage or destroy the shape of food items. Additionally, the sensor surface raises food safety concerns when touching one or more food items. Thus, the contact measurement method only applies to random and occasional sampling of food items, and this is not a reliable method to determine food temperature in continuous production.

US published patent application 2017/0138661 discloses a method for freezing food products to a select temperature by automatically self-adjusting the heat transfer based on the physical characteristics of food products that are measured in real time. For example, the reference suggests the application of infrared (IR) sensors for food product temperature measurement and freezer control. However, this has many drawbacks as discussed above, including the surface temperature measured by infrared sensor does not represent the average temperature of the product or its overall degree of freezing due to temperature gradients inside and on the surface of the food items during freezing. US2017/0138661 also describes a method to control the freezing process by continuously adjusting heat transfer. In many circumstances, continuous adjustment in operating parameters is not preferred. After a parameter is adjusted, it takes time for the system to reach stability, and additional adjustments within this response time may cause serious instability in process control and therefore poor product quality.

U.S. Pat. No. 5,189,366 discloses a method and apparatus for determining the temperature of a material where its conductivity changes with temperature, by passing samples through a coil system that generates an electromagnetic field. This patent asserts that the measurement method is substantially independent of cross-sectional area and size of the product being tested if the reactive and resistive components (as mentioned in that patent) are processed in accordance with the expression:

$$K_r = \frac{X}{R^a}$$

where $K_r$ is a computed amplitude, X is the reactive signal, R is the resistive signal and a is a power varying between 0.5 and 1.0 depending on the geometry of the material. In particular, this patent describes a trial and error method to predetermine the value of a by running a range of test samples with the same known conductivity and different known cross-section, and finding the best fitting value of a. However, the present inventors have determined that the results that can be obtained according to the teachings of this patent are not always independent of the size and dimensions of the products being measured, at least when the products are completely or partially frozen. In many commercial processes, there is variability in the mass, size, and shape of the products being processed. For example, in poultry processing there is significant differences in the size, shape and weight of the individual chicken breasts that are being processed. If the size or shape or weight of the chicken breasts significantly affected the $K_r$ readings, then it would be very difficult to deduce if the change in $K_r$ value represented a change in the average temperature of the product or simply a change in the weight, size, and/or shape of the product. This would render the $K_r$ reading impractical as a means of measuring the average temperature of the product.

By contrast, the present invention provides reliable techniques for assessing the temperature of a product, and of determining the degree of freezing of a product that is partially or completely frozen, in a manner that is not dependent on the size or shape of the product, and is non-invasive, and does not require contact with the product let alone physical penetration into the product. This invention also provides reliable techniques to avoid false readings from other factors like high production throughputs where multiple pieces of products can pass through the sensor at the same time. These advantages make the present invention highly useful in a large variety of applications, including but not limited to assessment of food products being cooled or frozen, or heated.

BRIEF SUMMARY OF THE INVENTION

One aspect of the present invention is a method of analyzing a product to determine its temperature, comprising:

(a) providing a correlation of the actual temperature of a product having the composition of the product that is to be analyzed, that is conductive, correlated with the phase angle exhibited by a product having the composition of the product that is to be analyzed, at two or more different actual temperatures, wherein the phase angle exhibited by a given product is a function of the reactive signal of the given product and the resistive signal of the given product measured in an electromagnetic field of a given strength and frequency applied to the given product;

(b) applying an electromagnetic field of said given strength and frequency to the product being analyzed, measuring the reactive signal and the resistive signal exhibited by the product being analyzed in said electromagnetic field at said given strength and frequency, and determining the phase angle exhibited by the product being analyzed from the measured reactive signal and resistive signal of the product being analyzed; and (c) determining the actual temperature of the product being analyzed from the phase angle determined in step (b) in accordance with said correlation.

Another aspect of the present invention is a method of analyzing a product to determine the degree of freezing of the product, comprising:

(a) providing a correlation of the degree of freezing of a product having the composition of the product that is to be analyzed, that is conductive, correlated with the phase angle exhibited by a product having the composition of the product that is to be analyzed, at two or more different degrees of freezing, wherein the phase angle exhibited by a given product is a function of the reactive signal of the given product and the resistive signal of the given product measured in an electromagnetic field of a given strength and frequency applied to the given product;

(b) applying an electromagnetic field of said given strength and frequency to the product being analyzed, measuring the reactive signal and the resistive signal exhibited by the product being analyzed in said electromagnetic field at said given strength and frequency, and determining the phase angle exhibited by the product being analyzed from the measured reactive signal and resistive signal of the product being analyzed; and (c) determining the degree of freezing of the product being analyzed from the phase angle determined in step (b) in accordance with said correlation.

Another aspect of the present invention is a method of operating equipment that provides product which is at an actual temperature within a desired range as it exits the equipment, comprising:

(a) passing a product that is conductive into and through equipment which is capable of subjecting the product within the equipment to at least one adjustable operating condition that is capable of modifying the temperature of the product within the equipment;

(b) applying an electromagnetic field of a given strength and frequency to the product at one or more of (i) a location that is within the equipment or (ii) a location at which the product leaves the equipment or (iii) a location at which the product enters the equipment, measuring the reactive signal and the resistive signal exhibited by the product in the applied electromagnetic field, and determining the phase angle exhibited by the product wherein the phase angle exhibited by a given product is a function of the reactive signal of the given product and the resistive signal of the given product measured in an electromagnetic field of a given strength and frequency applied to the given product;

(c) determining the actual temperature of the product from the measured phase angle in accordance with a predetermined correlation at two or more different actual temperatures of the product correlated with the phase angle exhibited by a product having the composition of the product being analyzed measured at said applied electromagnetic field of said given strength and frequency; and (d) when the difference between the actual temperature of the product determined in step (c) and a predetermined set point actual temperature of the product is more than a predetermined difference value, reducing said difference by adjusting at least one adjustable operating condition within the equipment to modify the actual temperature of the product in the equipment, so that the actual temperature of the product as it exits the equipment is within said desired range.

An alternative embodiment of the present invention is a method of operating equipment that provides product which is at an actual temperature within a desired range as it exits the equipment, comprising:

(a) passing a product that is conductive into and through equipment which is capable of subjecting the product within the equipment to at least one adjustable operating condition that is capable of modifying the temperature of the product within the equipment;

(b) applying an electromagnetic field of a given strength and frequency to the product at one or more of (i) a location that is within the equipment or (ii) a location at which the product leaves the equipment or (iii) a location at which the product enters the equipment, measuring the reactive signal and the resistive signal exhibited by the product in the applied electromagnetic field, and determining the phase angle exhibited by the product wherein the phase angle exhibited by a given product is a function of the reactive signal of the given product and the resistive signal of the given product measured in an electromagnetic field of a given strength and frequency applied to the given product;

(c) determining the difference between the phase angle exhibited by the product as measured in step (b) and a predetermined phase angle set point; and (d) when the difference measured in step (c) is more than a predetermined difference value, reducing said difference by adjusting at least one adjustable operating condition within the equipment to modify the temperature of the product in the equipment so that the actual temperature of the product as it exits the equipment is within said desired range.

Another aspect of the present invention is a method of operating equipment that provides product which exhibits a degree of freezing that is within a desired range as the product exits the equipment, comprising:

(a) passing a product that is conductive into and through equipment which is capable of subjecting the product within the equipment to at least one adjustable operating condition that is capable of modifying the degree of freezing of the product within the equipment;

(b) applying an electromagnetic field of a given strength and frequency to the product at one or more of (i) a location that is within the equipment or (ii) a location at which the product leaves the equipment or (iii) a location at which the product enters the equipment, measuring the reactive signal and the resistive signal exhibited by the product in the applied electromagnetic field, and determining the phase angle exhibited by the product wherein the phase angle exhibited by a given product is a function of the reactive signal of the given product and the resistive signal of the given product measured in an electromagnetic field of a given strength and frequency applied to the given product;

(c) determining the degree of freezing of the product from the measured phase angle in accordance with a predetermined correlation at two or more different actual degrees of freezing of the product correlated with the phase angle exhibited by a product having the composition of the product being analyzed measured at said applied electromagnetic field of said given strength and frequency; and (d) when the difference between the degree of freezing of the product determined in step (c) and a predetermined set point degree of freezing of the product is more than a predetermined difference value, reducing said difference by adjusting at least one adjustable operating condition within the equipment to modify the degree of freezing of the product in the equipment so that the degree of freezing of the product as it exits the equipment is within said desired range.

Yet another aspect of the present invention is equipment that is capable of modifying the temperature of product within the equipment, comprising:

a housing having a passageway extending through the housing from an entrance to an exit, and first apparatus which is capable of moving product through the passageway from the entrance to the exit, and one or more outlets within the housing from which liquid or gaseous heat transfer medium can be passed into the passageway to establish an environment to which product within the housing is exposed, wherein at least one condition to which product within the housing is exposed is adjustable to modify the temperature of product within the passageway;

second apparatus that is at one or more of (i) a location within the housing or (ii) a location at an exit from the housing or (iii) a location at an entrance into the housing, that is capable of applying an electromagnetic field to product, third apparatus operatively connected to said second apparatus and that is capable of measuring the reactive signal exhibited by product in the electromagnetic field and the resistive signal exhibited by product in the electromagnetic field and of calculating therefrom the phase angle exhibited by the product;

fourth apparatus operatively connected to said third apparatus and that is capable of determining the difference between a predetermined set point phase angle exhibited by the product, and the phase angle exhibited by the product passing through the passageway thereof, and fifth apparatus operatively connected to said fourth apparatus and that is capable of adjusting at least one operating condition to which the product is exposed within the housing to reduce said difference in response to said difference.

Alternative embodiments of the invention include:

Equipment that is capable of modifying the temperature of product within the equipment, comprising:

a housing having a passageway extending through the housing from an entrance to an exit, and first apparatus which is capable of moving product through the passageway from the entrance to the exit, and one or more outlets within the housing from which liquid or gaseous heat transfer medium can be passed into the passageway to establish an environment to which product within the housing is exposed, wherein at least one condition to which product within the housing is exposed is adjustable to modify the temperature of product within the passageway;

second apparatus within the housing and/or at an exit from the housing and/or at an entrance into the housing, that is capable of applying an electromagnetic field to product, third apparatus operatively connected to said second apparatus and that is capable of measuring the reactive signal exhibited by product in the electromagnetic field and the resistive signal exhibited by product in the electromagnetic field and of calculating therefrom the phase angle exhibited by the product;

fourth apparatus operatively connected to said third apparatus and that is capable of determining the difference between a predetermined set point temperature of the product, and the temperature of the product that corresponds to a calculated phase angle of the product in accordance with a predetermined correlation between the temperature of a reference product of the same composition as the product to being passed through the passageway and the phase angle thereof, and;

fifth apparatus operatively connected to said fourth apparatus and that is capable of adjusting at least one operating condition to which the product is exposed within the housing to reduce said difference in response to said difference.

Other alternate embodiments of the invention include equipment that is capable of modifying the degree of freezing of product within the equipment, comprising:

a housing having a passageway extending through the housing from an entrance to an exit, and first apparatus which is capable of moving product through the passageway from the entrance to the exit, and one or more outlets within the housing from which liquid or gaseous heat transfer medium can be passed into the passageway to establish an environment to which product within the housing is exposed, wherein at least one condition to which product within the housing is exposed is adjustable to modify the degree of freezing of product within the passageway;

second apparatus within the housing and/or at an exit from the housing and/or at an entrance into the housing, that is capable of applying an electromagnetic field to product, third apparatus operatively connected to said second apparatus and that is capable of measuring the reactive signal exhibited by product in the electromagnetic field and the resistive signal exhibited by product in the electromagnetic field and of calculating therefrom the phase angle exhibited by the product;

fourth apparatus operatively connected to said third apparatus and that is capable of determining the difference between a predetermined degree of freezing of the product, and the degree of freezing of the product that corresponds to a calculated phase angle of the product in accordance with a predetermined correlation between the degree of freezing of a reference product of the same composition as the product to being passed through the passageway and the phase angle thereof, and;

fifth apparatus operatively connected to said fourth apparatus and that is capable of adjusting at least one operating condition to which the product is exposed within the housing to reduce said difference in response to said difference.

Another aspect of the present invention is a method of operating equipment that provides product which exhibits a selected physical characteristic within a desired range as it exits the equipment, comprising:

(a) passing a product that is conductive into and through equipment which is capable of subjecting the product within the equipment to at least one adjustable operating condition that is capable of modifying the selected physical characteristic of the product within the equipment;

(b) applying an electromagnetic field of a given strength and frequency to the product at one or more of (i) a location that is within the equipment or (ii) a location at which the product leaves the equipment or (iii) a location at which the product enters the equipment, measuring the reactive signal and the resistive signal exhibited by the product in the applied electromagnetic field, and determining the phase angle exhibited by the product wherein the phase angle exhibited by a given product is a function of the reactive signal of the given product and the resistive signal of the given product measured in an electromagnetic field of a given strength and frequency applied to the given product;

(c) determining the difference between the phase angle exhibited by the product as measured in step (b) and a predetermined phase angle set point that corresponds to a desired value of the selected physical characteristic; and (d) when the difference measured in step (c) is more than a predetermined difference value, reducing said difference by adjusting at least one adjustable operating condition within the equipment to modify the selected physical characteristic of the product in the equipment so that the selected physical characteristic of the product as it exits the equipment is within said desired range.

Equipment according to the invention which is useful in performing the aforesaid method and is capable of modifying selected characteristic of product within the equipment comprises a housing having a passageway extending through the housing from an entrance to an exit, and first apparatus which is capable of moving product through the passageway from the entrance to the exit, and one or more outlets within the housing from which liquid or gaseous heat transfer medium can be passed into the passageway to establish an environment to which product within the housing is exposed, wherein at least one condition to which product within the housing is exposed is adjustable to modify the selected characteristics of product within the passageway;

second apparatus that is at one or more of (i) a location within the housing or (ii) a location at an exit from the housing or (iii) a location at an entrance into the housing, that is capable of applying an electromagnetic field to product, third apparatus operatively connected to said second apparatus and that is capable of measuring the reactive signal exhibited by product in the electromagnetic field and the resistive signal exhibited by product in the electromagnetic field and of calculating therefrom the phase angle exhibited by the product;

fourth apparatus operatively connected to said third apparatus and that is capable of determining the difference between a predetermined set point phase angle that corresponds to a desired value of the selected physical characteristic, and the phase angle exhibited by the product passing through the passageway thereof, and fifth apparatus operatively connected to said fourth apparatus and that is capable of adjusting at least one operating condition to which the product is exposed within the housing to reduce said difference in response to said difference.

As used herein:

By "actual temperature" is meant the average of the temperature of a product averaged throughout its entire mass.

For purposes of the present invention, the "actual temperature" can be determined in any of many different methodologies, provided that in any given implementation of the invention the aforementioned correlations and determinations are relative to the same methodology. When the product has no internal temperature gradients, determining actual temperature is easily done by touching a thermometer to the surface of the product or by inserting a thermometer into the product or in some cases using an infrared temperature sensor. However, in many industrial applications, the product exiting from a temperature control apparatus (e.g. continuous chiller) will have internal temperature gradients. In this situation, different techniques, that are familiar to those skilled in this area, are used to determine the actual or average or equilibrated temperature of the product. One of the ways is to put the product in a well-insulated container, that does not allow heat leak. Once the internal temperature gradients have disappeared, the above procedure using thermometers can be used to determine the actual temperature of the product. Another way to measure the actual or average temperature of a product with internal temperature gradients is to use a method like water calorimetry. In water calorimetry, a known mass of the product with internal temperature gradients is immersed in a known quantity of liquid, preferably water, which is at a known starting temperature. The liquid and product are contacted in a well-insulated container, so as not to allow heat leak from or to the environment. Once the temperature of the mixture of liquid-product has stabilized, this final mixture temperature is used to determine the actual temperature of the product before it is immersed into the liquid using an energy balance. Those skilled in the art, will recognize that there are many variations of the above techniques that can be utilized. For e.g. instead of using water, the product can be immersed in a boiling liquid like liquid nitrogen. In this case, the amount of liquid nitrogen vaporized is used in the energy balance equation to measure the actual temperature of the product.

By "degree of freezing" of a product is meant the portion of all normally liquid material that is present in the product in the solid phase, relative to the total amount of all normally liquid material that is present in the product in the solid or liquid phase, where "normally liquid material" is material that is liquid at 25° C. and one atmosphere pressure. Water is an example of a normally liquid material. A product is considered to be "partially frozen" if some, but not all, of the normally liquid material present in the product is solid. A product is considered to be "fully frozen" or "completely frozen" if all of the normally liquid material present in the product is solid.

By "cooling" a product is meant removing heat from the product, thereby reducing the temperature of the product; "cooling" includes removing heat from the product without causing any of the normally liquid material in the product to freeze, and includes removing heat from the product and causing freezing of some of the normally liquid material, or freezing of all of the normally liquid material, that is in the product.

By "conductive" is meant that a product is electrically conductive, electromagnetically conductive, or both, to at least a degree that the product emits a signal when it is in an electromagnetic field. A product can be "conductive" if it contains water (whether liquid, solid, or partially liquid and partially solid) or contains one or more substances which render the product conductive. Examples of such substances include ions formed by ionization in water of an organic or inorganic ionic compound and include dissociated organic and inorganic acids or salts. Other materials within the product that make it electro-magnetically conductive can also be substituted with water.

By "phase angle" is meant a particular characteristic property, as defined in Equation (1) herein, of a product exhibited in an electromagnetic field. By way of further explanation of how this equation is of importance, when an alternating current electromagnetic field is applied to an electro-magnetically conductive product, a separate alternating field is generated in the product itself. In this case the phase angle is defined as the shift or delay between the applied and induced alternating current electromagnetic fields. This shift or delay or phase angle is due to the reactance ($X_{product}$) and resistance ($R_{product}$) of the product and is mathematically equal to the arctangent of the ratio of $X_{product}$ and $R_{product}$ $$\left( \arctan\left( \frac{X_{product}}{R_{product}} \right) \right).$$

In commercially available metal detector equipment, a reactance signal ($X_{signal}$) and a resistive signal ($R_{signal}$) from the product are measured by the detector electronics when a product passes through the metal detector generated electromagnetic field. These signals are either the same as or related to the $X_{product}$ and $R_{product}$. Differences between the actual reactance and resistance versus those measured by electronics may be due to multiple factors including distance of the measuring coils, and distance between product and measuring coils. The phase angle discovered to be useful in this invention is preferably defined as the arctangent of the ratio of measured reactance and resistive signals $$\left( \arctan\left( \frac{X_{signal}}{R_{signal}} \right) \right).$$

While as a general matter the phase angle could also be a modification of any of the above mathematical functions displaced by a constant, e.g. shifting the phase angle by 90 degrees, $$\left( \arctan\left( \frac{X_{signal}}{R_{signal}} \right) + 90 \right),$$

and additionally, the phase angle can as a general matter be any mathematical function of $X_{product}$, $R_{product}$, $X_{signal}$, $R_{signal}$, that meets the following criteria (a) the reactance and resistance values are normalized to reduce the effect of mass, size, dimensions of the product and amplify the effects of temperature (b) a dampening function is then applied to further reduce the effect of mass, size, dimensions at all temperatures of interest, and (c) the mathematical function should be monotonic with respect to temperature, preferably at least at all temperatures of interest; the phase angle of Equation (1) herein has been discovered to satisfy all of these considerations.

DETAILED DESCRIPTION OF THE INVENTION

Figure 1A:
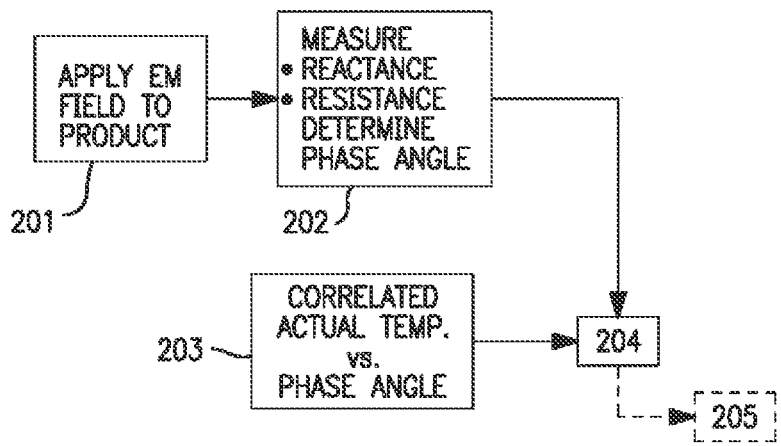
FIG. 1A is a flowchart of a method of temperature determination according to the present invention.

The present invention is useful in any physical application in which it is desired to determine the actual temperature of a product, or to determine the degree of freezing of a product. Many examples exist in commercial methods for manufacturing, treating, heating, or cooling of products. A preferred example is in the cooling of food products, such as by use of equipment that is used to cool or freeze food products (by which is meant products that are entirely edible, and products which are edible and are contained in packaging that may not itself be considered to be edible). The following description will refer to cooling (or freezing) of food products, to illustrate the present invention, but without being intended to limit the applicability of the invention to such applications. Examples of food products with which this invention can be implemented include water, aqueous beverages, fruits, vegetables (whole or sectioned), seafood, poultry, meats other than seafood and poultry, ready-to-eat foods, food ingredients, and baked goods.

The present invention utilizes heretofore unrecognized relationships between a product's exhibited phase angle, as defined herein, and the actual temperature of the product, and between a product's exhibited phase angle, as defined herein, and the degree of freezing of the product. The phase angle is associated with the degree of freezing or the determined (or, equilibrated) temperature of a product that is conductive, based on detection of the electromagnetic field emitted by the product when exposed to an external electromagnetic field. Such products exhibit a combination of both resistive and reactive properties, with the combination thereof known as impedance. Specifically, the resistance originates from the ions in the product (such as, in a food product) while the reactance is driven by the capacitive property of the product. Both of these properties are influenced by the actual temperature of the product and its composition.

When the product is exposed to an external (primary) electromagnetic field, eddy currents are induced in the product which generate a secondary electromagnetic field, and the secondary electromagnetic field is measured as a complex signal, which is further decomposed to resistive signal and reactive signal by a detector. There is a shift or delay between the primary applied field and the secondary generated field. This shift or delay is sometimes referred to as phase angle. The amplitude, frequency, and phase angle of the secondary complex signal are affected by the resistance and reactance of the product as well as by the amplitude and frequency of the primary field. The most preferred frequency of the primary electromagnetic field is between 100 kHz and 1 MHz, but frequencies in a larger range between 50 kHz and 1000 kHz can also be used. As is known in this technical field, the desired frequency of the electromagnetic field is provided by applying an alternating current having that desired frequency. (While direct current could be utilized to establish an electromagnetic field, alternating current is preferred.) Particularly, the phase angle of the secondary complex signal, the amplitude of the resistive signal (R or $R_{signal}$) and the amplitude of the reactive signal (X or $X_{signal}$) is strongly correlated to the resistance and the reactance of the product. The phase angle θ is determined from Equation (1):

$$\theta = \arctan(\text{reactive signal/resistive signal}) \quad (1)$$

As described further below, both resistive signal and reactive signal and therefore the phase angle of a given product have been found to be influenced by temperature, by phase change during freezing, and by degree of freezing of the product. The reactive and resistive signals referred above could be the basic property of the product, at a given temperature when subjected to a given primary field, or it could be a function of this basic property as measured by equipment that detects the secondary induced field. The phase angle could also be a modification of equation 1, for e.g. shifting the phase angle by 90 degrees, $$\left( \arctan\left(\frac{\text{reactive signal}}{\text{resistive signal}}\right) + 90 \right).$$

Figure 4A:
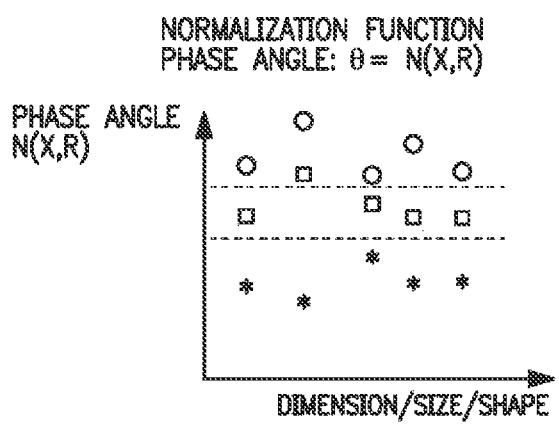
FIGS. 4A and 4B are representative graphs upon application of Normalization function and Dampening function on phase angle to get temperature sensitive accuracy independent of mass, size, shape or dimension.
Figure 4B:
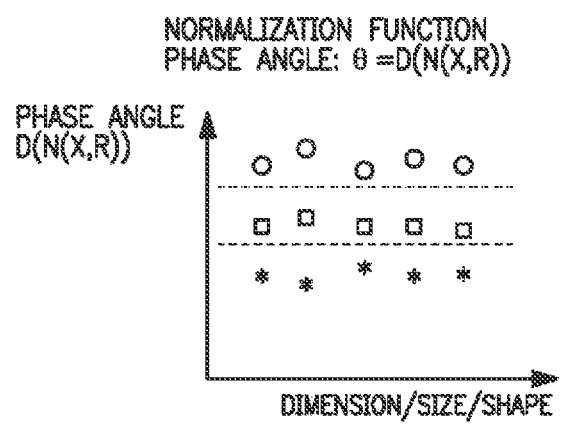

In general, the phase angle can also be defined as any mathematical function of the reactive and resistive signals meeting the following criteria.

i. Apply a normalizing function to the reactive and resistive signals, N(X, R), that reduces the effects of mass, size, shape of the product, but amplifies the contrast between temperature effect and size/dimension effect. Some examples of normalization function are $$\frac{X}{R}, \frac{X^\alpha}{R^\beta},$$

where α,β are constants ii. In some cases, a Dampening Function D(N(X,R)) is also required to be applied to the normalization function, to further dampen out size/dimension effect for temperature control applications. Some examples of dampening function are, Arctan(N), Arctan(N)+A, where A is a constant The main purpose of the normalization and dampening function are to ensure that the final mathematical function that represents phase angle is essentially independent of product mass, size and dimensions, without sacrificing the ability to detect changes in product temperature. The following factors must be considered in the selection of Normalization Function and Dampening Function. The application factors include food temperature, requirement in the accuracy of food temperature, food dimension/size and possible variations in food dimension/size. Normalization alone (FIG. 4A), or Normalization and Dampening Function (FIG. 4B) together should ensure that phase angle variation from size/dimension/shape is within requirement in temperature measurement accuracy. In FIGS. 4A and 4B, square, star, circle symbols are food items at set temperature, set temperature plus accuracy (6), set temperature minus accuracy respectively. For example, five square symbols represent five food items with different dimensions/sizes at set temperature. Ideally, phase angle should be completely independent of size/dimension so symbols with the same temperature should form a straight horizontal line in FIG. 4B. In temperature control applications, Normalization and Dampening Function can be selected if there is no overlap in phase angle value of food items at different temps. In detail, the maximum value of phase angle from the group of squares is smaller than the minimum value from the group of circles, and the minimum value of phase angle from group of square is larger than the maximum value from group of star. max $\theta^{T=T_{set}}$ < min $\theta^{T=T_{set}-\delta}$, min $\theta^{T=T_{set}}$ > max $\theta^{T=T_{set}+\delta}$. For example, the above stated requirement is not satisfied in FIG. 4A because Normalization function alone is not able to eliminate the effect of dimensions/sizes. In this case, both Normalization and Dampening function are necessary for phase angle definition in order to measure temperature. The final mathematical function should also be monotonic with respect to product temperature. This is to ensure that the function does not lose the ability to identify differences in product temperature. However, for purposes of the present invention, it has been determined that the definition of Equation (1) satisfies all of these considerations and provides the phase angle after all such normalization and dampening have been implemented; that is, no normalization or dampening of the phase angle value is necessary to be carried out after the phase angle has been determined according to Equation (1). In addition, it will be recognized that the ratio of (reactive signal) to (resistive signal) is independent of the particular units of each signal, provided that the value of each signal is determined in the same units.

Referring now to FIG. 1A, there is shown a flowchart of steps that can be carried out to determine actual temperature of product according to the present invention.

Element 201 represents a method step in which an electromagnetic field is applied to the product. Element 202 represents a step in which the reactive signal and the resistive signal of the product in response to the applied electromagnetic field are measured, and the phase angle is determined according to Equation (1) based on the amplitude of the reactive signal and resistive signal that are measured in this step. A preferred embodiment is to provide a plurality of electrical coils and to pass the product through the coils while flowing alternating current through one of the coils to establish an electromagnetic field through which the product passes. The other coils of the plurality are used to detect the secondary complex signal that is emitted by the product following its passage through the electromagnetic field of the first coil. The resistive and reactive components of the secondary complex signal are determined by a detector. Apparatus that performs these functions is known. The phase angle is preferably determined from the portion of the signal that appears as a flat "tail", disregarding (or filtering, visually or electronically) any peaks that are properly characterized as "noise".

It will of course be recognized that in order for detection of the secondary signal from the product to be possible, the respective coils will need to be positioned close enough to each other (taking into account the relevant factors such as the strength of the electromagnetic field through which the product is passed, the velocity at which the product moves through the first coil and toward the detecting coils, and the ability of the product to continue emitting its electromagnetic field after it has passed through the first coil) so that the signal emitted by the product can be detected by the detecting coils.

Element 203 represents a correlation that has been separately established, of the actual temperature of a reference product that has the same composition as the product being treated to its exhibited phase angle as determined in an electromagnetic field of the same strength and frequency as the electromagnetic field that was applied to the product in step 201. The correlation is preferably established by subjecting a reference product, having the same composition as the product to be analyzed, at different actual temperatures (preferably at least two different actual temperatures and more preferably 2 to 10 different actual temperatures), to an electromagnetic field of the strength and frequency to which the product being analyzed is being subjected, and determining the phase angles exhibited by each sample of the reference product that was at each of the respective temperatures by measuring the resistive signal and reactive signal values and calculating the phase angle according to Equation (1) or any other functions of reactive and resistive signal as described earlier. This correlation will generally be different for each product or type of product that is being subjected to the present invention. As is described herein, it has been discovered that different actual temperatures of a product correspond to different phase angles obtained.

As indicated, the aforementioned correlation between the actual temperature of the product being analyzed and the phase angle exhibited by the product being analyzed can be established directly, that is, by actual testing of reference products having the same composition as the product to be analyzed. However, the present invention can also be implemented by establishing the correlation indirectly, that is, by establishing (through actual testing) a first correlation between the phase angle exhibited by a product having the same composition as the product to be analyzed and a reference product whose composition differs from the product to be analyzed, and a second correlation between the phase angle exhibited by the reference product and the actual temperature of a product having the same composition as the product to be analyzed. In this way, reference products that differ by only a few percent (up to 5% or even up to 10%) in one or more compositional components from the product to be analyzed can be used in practicing this invention. Thus, it is not always necessary that the composition of the reference products is the same as that of products to be analyzed. For example, a survey (Husak, Ryan Lon, "A survey of commercially available broilers originating from organic, free-range and conventional production systems for cooked meat yields, meat composition and relative value." (2007). Retrospective Theses and Dissertation, 14523.) showed that average moisture levels in commercially available thigh meat in USA have a standard error of mean (SEM) of 1%. In this situation the reference products can be chosen as long as the composition of reference products only differs by only a few percent (up to 10%) in one or more compositional components from the composition of product to be analyzed. Alternatively, United States Department of Agriculture has established food composition databases where the composition of food products with different Universal Product Code (UPC) is documented. The reference products should have the same UPC number with the products to be analyzed.

Element 204 represents a step in which the actual temperature of the product that has been subjected to steps 201 and 202 is determined, by finding in the aforementioned correlation (in element 203), for the product being treated, the actual temperature that corresponds to the phase angle that was determined as a result of carrying out steps 201 and 202.

Optional element 205 represents utilization of the determined actual temperature for any of many functional purposes, such as controlling the operation of apparatus that treats or processes the product whose actual temperature is being determined. The description herein of the control of food cooling apparatus is one example of such a utilization of actual temperature that is determined in accordance with the present invention.

Figure 1B:
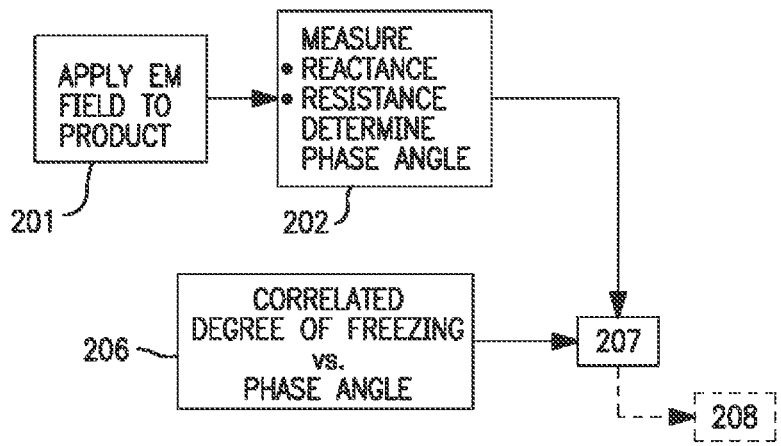
FIG. 1B is a flowchart of a method of determination of degree of freezing according to the present invention.

Referring now to FIG. 1B, there is shown a flowchart of steps that can be carried out to determine the degree of freezing of a product in the manner according to the present invention.

Elements 201 and 202 in FIG. 1B represent the same method steps as described above with respect to FIG. 1A.

Element 206 in FIG. 1B represents a correlation that has been separately established, of the degree of freezing of the product being treated to its exhibited phase angle as determined according to Equation (1) in an electromagnetic field of the same strength and frequency as the electromagnetic field that was applied to the product in step 201. The correlation is typically established by subjecting reference samples of the product at different actual degrees of freezing (preferably at least two different degrees of freezing and more preferably 2 to 10 different degrees of freezing) to an electromagnetic field of the strength and frequency at which the invention is being carried out, and determining the phase angles exhibited by each sample of the product that was at each of the respective degrees of freezing by measuring the resistive signal and reactive signal values and calculating the phase angle according to Equation (1) or any other functions of reactive and resistive signal as described earlier. This correlation will generally be different for each product or type of product that is being subjected to the present invention. Methodology to determine degree of freezing is described below with respect to FIG. 1C.

Element 207 in FIG. 1B represents a step in which the degree of freezing of the product that has been subjected to steps 201 and 202 is determined, by finding in the aforementioned correlation (in element 206), for the product being tested, the degree of freezing that corresponds to the phase angle that was determined as a result of carrying out steps 201 and 202.

Optional element 208 in FIG. 1B, like optional element 205 in FIG. 1A, represents utilization of the determined degree of freezing for any of many functional purposes, such as controlling the operation of apparatus that treats or processes the product whose temperature is being determined. The description herein of the control of food cooling apparatus is one example of such a utilization of temperature that is determined in accordance with the present invention.

Figure 1C:
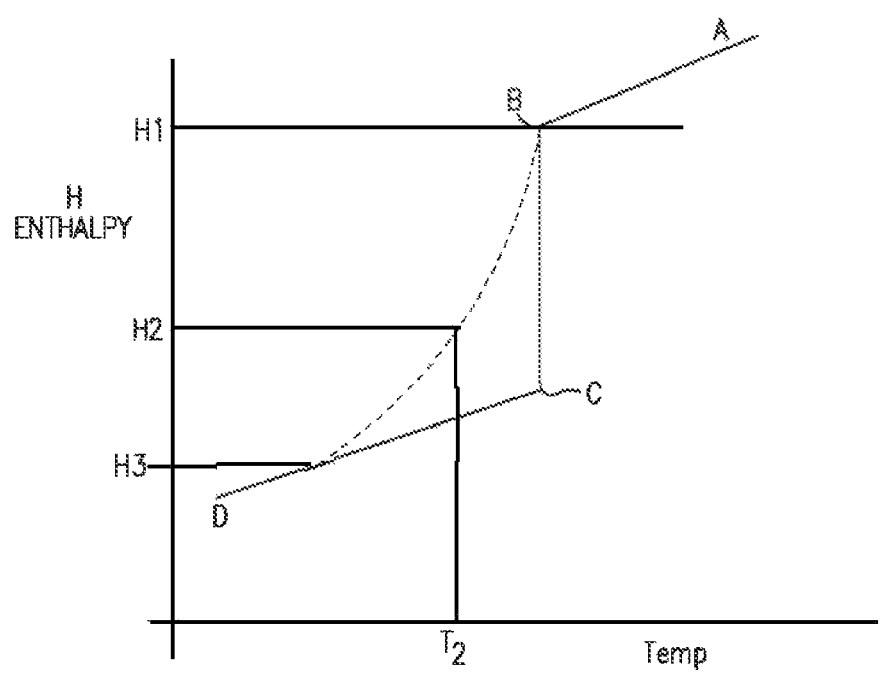
FIG. 1C is a representative graph of enthalpy versus temperature of a product, at temperatures extending from the point at which the product is not frozen at all to a point at which the product is fully frozen.
Figure 1D:
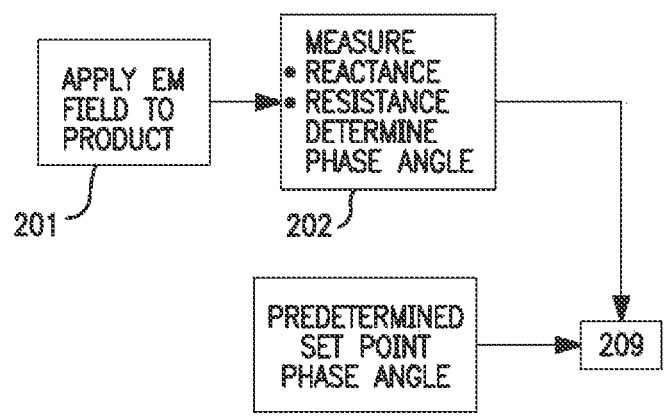
FIG. 1D is a flowchart of another method to achieve a desired value of a selected property according to the present invention.

Referring now to FIG. 1D, there is shown a flowchart of steps that can be carried out to control the operation of apparatus that treats or processes the product whose temperature is being determined.

Elements 201 and 202 in FIG. 1D represent the same method steps as described above with respect to FIG. 1A.

Element 209 in FIG. 1D, like element 205 in FIG. 1A, represents utilization of the determined phase angle that has been subjected to steps 201 and 202 for any of many functional purposes, such as controlling the operation of apparatus that treats or processes the product whose phase angle is being determined. The predetermined set point phase angle corresponds to a desired value of the selected physical characteristic of the product. The description herein of the control of food cooling apparatus is one example of such a utilization of temperature that is determined in accordance with the present invention.

Turning to FIG. 1C, the solid line that extends between points A and D represents the idealized relationship between enthalpy of a pure liquid such as water and its temperature. In the region of point A, the pure liquid is entirely in the liquid state. As heat is removed from the liquid and the enthalpy of the liquid decreases, the liquid cools and its temperature decreases, as illustrated in the segment from the region of point A to point B. Point B represents the first onset of freezing of the pure liquid.

As additional heat is removed from the liquid its enthalpy continues to decrease. In the idealized setting, the temperature of the pure liquid would remain constant until point C is reached which represents the point at which the pure liquid has become completely frozen. In the idealized circumstances the line connecting points B and C is vertical and the point at which this line intersects the temperature axis is considered to be the freezing point of the pure liquid. Then, as additional heat is removed from the now completely frozen product, the enthalpy of the product continues to decrease toward the region of point D.

In situations in which the product is a mixture that contains liquid, and solids, and other ingredients some of which may be solubilized in the liquid or solid, the removal of heat and enthalpy from the product, after the enthalpy has been reduced to reach point B, causes the temperature of the product to decrease gradually along a path illustrated as the dotted line in FIG. 1C. This gradual reduction of the temperature even as more and more of the liquid in the product is gradually becoming frozen corresponds to freezing point reduction of the product, caused by other components present in the product. Thus, for any enthalpy content H2 of the product there is a corresponding temperature T2. This also means that actual temperature can be substituted by enthalpy throughout this document.

The degree of freezing of any given product can be determined by establishing a reference curve (i.e. the curve that appears as a dotted line in FIG. 1C) for the product in question, by carrying out a series of determinations of the temperature T2 that corresponds to a series of different values of enthalpy of the product between H1, which is the enthalpy value at point B where freezing first commences, and H3, which is the enthalpy value at which no more liquid in the product can be frozen. Then the degree of freezing of the product is determined as the value of (H1 minus H2)/(H1 minus H3), expressed as a percentage.

Devices can be utilized in any of several different ways to carry out these functions. That is, a device which receives input from the coils can measure and provide to the user the values of the reactive signal and of the resistive signal, from which the user separately (or manually) determines the phase angle and determines from the phase angle the actual temperature or the degree of freezing, as the case may be, from predetermined correlation of the phase angle with actual temperature or degree of freezing. Alternatively, a device can receive input from the coils and directly determine and provide to the user the phase angle (i.e. from having measured the reactive and resistive signals), from which the user separately (or manually) determines the actual temperature or the degree of freezing, as the case may be, from the aforementioned correlation. Alternatively, a device can receive input from the coils, directly determine the phase angle (i.e. from having measured the reactive and resistive signals), and directly determine and provide to the user the actual temperature or degree of freezing, as the case may be, from the aforementioned correlations already contained in the device. Another alternative is for the user to receive from a device the values of the reactive and resistive signals, and then input those values into a device which directly determines the phase angle, determines actual temperature or degree of freezing from correlations already in the device.

Any of these embodiments can be combined, even in the same device, with control of conditions within equipment for treating the product in question, such that the conditions are adjusted and controlled as a function of the reactive and resistive signals and temperature or degree of freezing values determined from the phase angle. The invention is described in further detail with reference to the application of the invention to apparatus in which food products can be cooled and, if desired, frozen. Experiments have established that (A) reliable and reproducible correlation exists between the actual temperature of a product (and its degree of freezing) and its exhibited phase angle at different temperatures; and (B) the correlation exists whether the water content in the product is completely unfrozen, partially frozen, or completely frozen, such that the extent of freezing of the water content can also be determined; and (C) the correlation is independent of the mass, size and dimensions of the product, thus greatly enhancing the ability of the methodology of the present invention to be useful in determining actual temperature on a basis that permits comparison of results across varying product samples.

Figure 2:
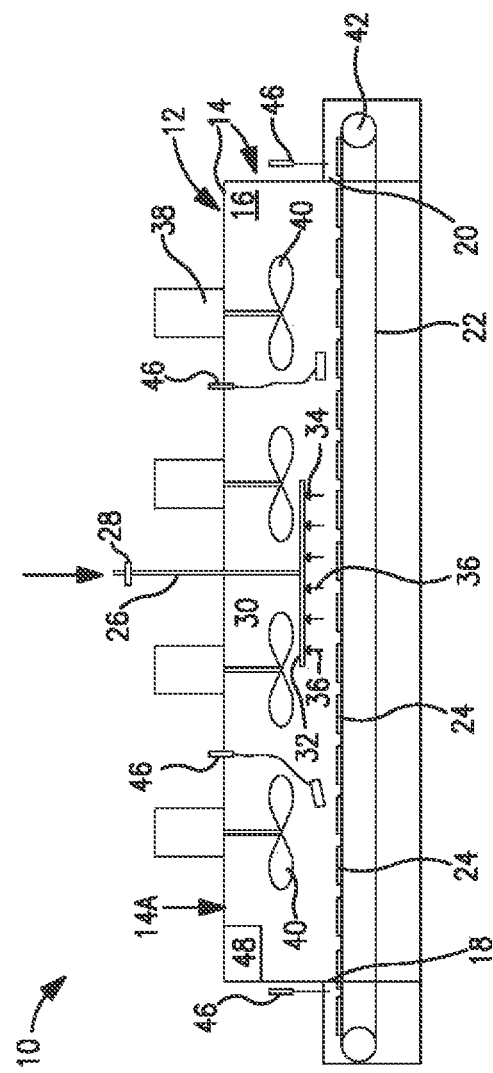
FIG. 2 is a cross-sectional view of apparatus with which the present invention can be practiced.

Referring to FIG. 2, a typical apparatus useful for cooling or freezing of food, or heating product if modified as described herein, and implementing the present invention is shown.

Apparatus 10 that is useful for cooling, freezing, or heating of product includes a housing 12 formed of a top wall 14A and a plurality of sidewalls 14 that define an internal chamber 16 therein. An inlet 18 is provided through one of the sidewalls 14, while an outlet 20 is provided in another one of the sidewalls, usually positioned at an end of the housing 12 opposite to inlet 18. The inlet 18 and the outlet 20 provide for communication between the chamber 16 and the areas outside the apparatus 10. A transport assembly such as a conveyor belt 22 moves through chamber 16 and conveys food product 24 from the inlet 18 through the chamber 16 to the outlet 20. The conveyor belt 22 can be of any known type of construction, such as for example a stainless steel mesh belt. Belt 22 is propelled by any conventional equipment, such as a drive motor which is represented as 42 in FIG. 2.

For cooling of product 24 in apparatus 10, an atmosphere is established in chamber 16 that is cold enough to cool or, if desired, to freeze, product 24. Some embodiments employ injection of cold gas or cryogen, by which is meant the liquid or solid state of substances that is gaseous at ambient conditions of 32° F. and one atmosphere of pressure; examples include liquid nitrogen and particles of solid carbon dioxide ("dry ice snow"). As is known in this technical field, the passage of liquid carbon dioxide from the outlet into the passageway causes the liquid carbon dioxide to form solid, that is, the aforementioned dry ice snow. This is considered in the practice of this invention to be passage of liquid heat transfer medium from the outlet. Cryogen can be introduced through a pipe 26 into chamber 16. The pipe 26 can include a valve 28 such as a modulating control valve, to control or restrict the amount of cryogen being introduced into the chamber 16 of the apparatus 10. The cryogen pipe 26 is in fluid communication with a remote source (not shown) of cryogen which can be for example nitrogen, liquid nitrogen (LIN) or liquid carbon dioxide. An end 30 of the pipe 26 in the chamber 16 is branched or split into a plurality of sections 32 or portions to provide a spray bar comprising a plurality of nozzles 34 which operates as a distribution arm or manifold for the cryogen being provided from the pipe. The sections 32 may also be provided with at least one and for most applications a plurality of nozzles 34 which distribute or jet a spray 36 of the cryogen onto the food product 24 passing proximate thereto on the conveyor belt 22. The cryogen spray 36 is usually in the form of LIN or solid carbon dioxide snow for withdrawing heat from the food product passing beneath the nozzles 34.

In an alternative embodiment, the cold atmosphere is established in chamber 16 by refrigeration unit 48, which draws the atmosphere (cold air) that is within chamber 16 into unit 48 and across pipes, fins, or other metal surfaces that are chilled by liquid coolant or refrigerant passing through them, and discharges the cooled atmosphere from outlets in unit 48 into chamber 16. Unit 48 can be relied on to the exclusion of cryogen, in which case pipe 26 and sections 32 and the nozzles 34 need not be present, or unit 48 can be employed together with the apparatus that applies cryogen.

The housing 12 is also provided with at least one and for most applications a plurality of motors 38, each one of which is connected to and drives a corresponding fan 40 for circulating and moving within chamber 16 the cryogen product 36, or the cold atmosphere provided by refrigeration unit 48, as the case may be, and to maintain the atmosphere in the chamber 16 to a desired cold temperature that will reduce the temperature of the product. It will be recognized that depending upon the cooling technique being used the atmosphere could be isothermal, or co-current (temperature profiles in the same direction as the product being conveyed within the freezer atmosphere) or counter-current (temperature profiles in opposite or dissimilar directions as the product being conveyed within the freezer atmosphere), and can utilize impingement, convection or contact cooling. Movement of the fans 40 provides for distributing the cold atmosphere across the chamber 16 so that food product 24 entering at the inlet 18 begins to be subjected to heat transfer and therefore chilling and/or freezing. The motor(s) 38 could be mounted external to the housing 12 so that heat from the motor(s) has minimal effect on the atmosphere in the chamber 16. The configuration of the conveyor belt 22 is a straight belt with a single pass or multiple passes.

The equipment includes one or more units 46 capable of subjecting product 24 to an electromagnetic field and measuring the resistive signal and reactive signal of the product in response to the electromagnetic field. A unit 46 can be located at one or more of the following locations, all of which are shown in FIG. 2 (although units 46 do not have to be located at all of the locations shown in FIG. 2); (i) within housing 16, and/or (ii) at outlet 20; and/or (iii) at inlet 18. One or more units 46 can also be separate unit(s), placed before or after unit 10 in the conveyor and measurement and/or control communication with unit 10. In some cases, only a unit 46 at the inlet 18 can also be utilized, especially if the shape, size and dimensions of each product is constant and the only change that ever occurs to the product is its inlet temperature. The unit 46 can comprise, or can be connected to, devices having any of the combinations of capabilities mentioned above.

In an alternate embodiment, the apparatus 10 can be an enclosed housing having all the aforementioned features described herein with respect to FIG. 2, but in which the belt follows between the inlet and the outlet a curved path within the apparatus in which the belt passes over itself repeatedly in a vertical stack of rows surrounding a central axis, forming a spiral or helix. Examples of such apparatus, known as spiral freezers, are found in numerous patents such as U.S. Pat. Nos. 5,398,521, 6,912,869, and 4,953,365.

In other alternative embodiments, the apparatus 10 is an open or closed trough or U-shaped container or vessel, or a tubular jacketed device (such as a scraped surface heat exchanger) through which the food product 24 is moved forward by the action of an auger, or a rotating paddle or multiple rotating paddles mounted on a shaft driven by a motor.

In addition to continuous chilling or heating processes and equipment, batch processes and systems (such as cabinet freezers or batch meat mixers) can also benefit from this invention. Product samples can be taken out manually or automatically from inside the chamber or mixing vessel using a sampling system, measured using the inventive process described above, and set the necessary residence time and operating conditions manually or automatically to achieve a desired actual temperature or degree of freezing for the product.

In some commercially utilized equipment where temperature of product is being changed or controlled, the products can be single pieces passing through, arrayed in a column that is aligned in the direction in which the products are moving, with gaps between pieces of products in the column. In many instances, the pieces of product are also arrayed in rows that are perpendicular to the direction in which the products are moving, so that multiple pieces in a given row pass through at the same time, sometimes in contact with each other or at other times with small gaps between them. For example, when beef patties are formed and frozen in a food processing facility, it is typical to provide a row of 4 to 6 patties lined up along the width of a conveyor belt that goes through the freezer. There is typically a gap of a few inches or less between the patties in the same row.

When operating this invention with a plurality of pieces of product, it is of course desirable to obtain reliable readings of each piece of product, without false readings such as may be caused by interference between the responses of a given piece to an electromagnetic field and of any other pieces also being analyzed in the field. It is believed that the risk of such false readings due to interferences between the responses of multiple pieces of product can be reduced or avoided by providing sufficient spacing between pieces of product as they pass through a given electromagnetic field. The spacing to be provided would include the distance between pieces in the direction that the pieces are moving through the field, and would likely also include the distance between the pieces in the direction perpendicular to the direction that the pieces are moving through the field. The distances between pieces that are sufficient to avoid interferences can be readily determined experimentally for any given apparatus and set of products, for instance by subjecting a single piece to the field and determining the phase angle (or determining a property such as actual temperature from the phase angle), and then repeating the step with that piece as well as one or more additional pieces present that are a measured distances from the first piece; and then determining the distances from the first piece at which the reading (such as phase angle or temperature) that was obtained with the single piece is seen to change; and then operating the invention with multiple pieces that are spaced apart by more than the distance at which the reading for the first piece was seen to change.

One measure of the distance that would be suitable, where a plurality of pieces of product are passing through the electromagnetic field as a column that is aligned in the direction in which the pieces are moving through the field, is to maintain enough distance along the direction of movement such that at most only one product in the column is subjected to the electromagnetic field at any given time; that is, a piece of product enters the field only after the piece immediately ahead of it in the column has left the field. In application, the gap between pieces of product in a column can be resolved by adjusting the speed of the conveyor belt to be faster than upstream operations and thereby creating gaps between the pieces of product.

The apparatus 10 and similar equipment can be utilized to heat the product 24 instead of cooling it, in which case hot air or a hot gaseous composition such as steam is fed into the housing 16 from unit 48 or from nozzles 34 instead of cryogen or chilled air. Heating can be carried out to simply raise the temperature of the product, or to cook it, or to thaw it from a completely or partially frozen state.

Figure 3:
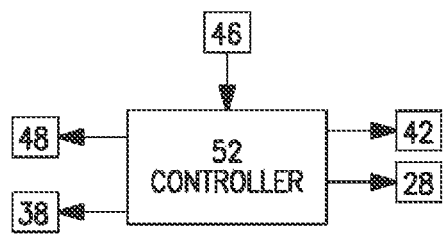
FIG. 3 is a schematic representation of connections to implement the present invention.

Referring now to FIG. 3, a controller 52 processes real time input from the one or more units 46 corresponding to the reactive signal and resistive signal detected by each unit 46, and determines the phase angle from the reactive signal and resistive signal input. Controller 52 determines an actual temperature that corresponds to the phase angle, from a correlation of phase angle with actual temperature that has previously been provided into the controller. Controller 52 then compares the thusly determined actual temperature with a predetermined set point actual temperature and determines the difference, if any, between the determined actual temperature and the set point actual temperature as well as the direction of the difference (that is, whether the difference indicates that the determined actual temperature is higher than the set point actual temperature or lower than the set point actual temperature). It is advantageous to carry out these determinations and comparisons intermittently, such as every 0.1 to 20 seconds, rather than continually. An equivalent approach applies to measuring and controlling the degree of freezing vs the actual temperature of the product.

Controller 52 is connected to one or more of the operational components of the apparatus 10 which affect the function of the apparatus to remove heat from the product, (or to heat the product, as the case may be) to provide control of the operation of such components. Such components include, but are not limited to the speed of motor 42, by which the speed at which the belt moves through the housing 16 can be controlled, thereby enabling an increase or decrease of the length of time that product is exposed to cooling or heating conditions in chamber 16;

the adjustment of the temperature that is established by unit 48, and/or the rate at which the cooling or heating atmosphere is cycled through unit 48, thereby enabling control of the temperature of the cooling or heating atmosphere to which the product is exposed;

the rate at which gaseous heat transfer medium (e.g. cryogen or cold air for cooling the product, or hot air or steam for heating the product) is fed into chamber 16 or onto product 24, for instance by adjustment of valve 28, thereby enabling control of how much of such heat transfer medium is available to be applied to the product 24;

the temperature of the heat transfer medium that is fed into chamber 16, thereby enabling control of the rate at which the heat transfer medium cools or heats the product 24;

the speed of the motors 38 that rotate the fans 40, thereby enabling control of the rate at which the heat transfer atmosphere is circulated within chamber 16 and impelled toward product 24.

The controller 52 can be connected to any one, or any number more than one, of the aforementioned operational components of the apparatus 10, as the operator desires, to control the operation of the apparatus in adjusting the temperature within the apparatus.

The interconnection between units 46, and the one or more operational components, allows apparatus 10 to operate to automatically control and optimize food cooling or freezing or heating, and can also provide feedback to the operator to permit more precise oversight and control of other processes positioned upstream and downstream of the apparatus 10.

Each unit 46 measures the product phase angle exhibited by each product passing through the electromagnetic field of a unit 46. For the detected phase angle exhibited by the product, actual temperature of the product is determined from predetermined phase angle-actual temperature correlation, and compared with the desired temperature. If the actual temperature of the product is higher than the desired set point, it means that the product would need further chilling before reaching acceptable limits and a reject/rework condition can be triggered. Also, the difference between the actual temperature and the desired temperature will be used by the controller 52 to determine if any changes to the apparatus operating parameters are needed to make sure that the product is exiting at the desired equilibrated temperature. The apparatus operating parameters include set point temperature, conveyor belt speed, fan speed, number of fans operating if more than one, refrigerant control valve opening percentage, and other parameters. In this example the product is under-frozen. This will trigger the freezer to reduce its gas temperature set point. Another possibility is to decrease belt speed (to increase dwell time) or increase fan speed. Of course, any combination of these operating parameters can be adjusted together. On the other hand, if the product actual temperature detected is lower than desired set temperature, this indicates that the product is being over-frozen. The freezer will similarly alter its operating parameters to reduce refrigeration capacity of the freezer to again make sure that the product is exiting the freezer at the desired actual temperature. This approach results in reducing freezer operating costs.

The phase angle value exhibited by a food product passing through a unit 46 is collected every 0.1 to 20 seconds (preferably in the range of once every 0.5 to 3 seconds) and stored. The phase angle can also be collected every time a new piece of product goes through the electromagnetic field. The number of phase angle values collected for statistical analysis could be from 20-2000 (preferably in the range of 50-500). If this value is reached before the time elapses, the oldest phase angle will be eliminated once a new one is collected. The sample set is statistically analyzed and compared with a predefined target phase angle every 1 to 300 seconds (preferably in the range of 10-100 seconds). And if the difference is greater than a predetermined difference value, one or more of the operation parameters will be adjusted. While the present invention can be practiced by continuously measuring the reactive and resistive signals, and determining and processing phase angle continuously, non-continuous measuring and determining and processing are preferred. When the operating condition(s) of the freezer are adjusted, there is always a lag time for the modified operating condition to reach a steady state value. If subsequent changes to the operating condition are made before the previous change has had a chance to reach steady state, the freezer operation can become unstable. For this reason it is preferred to not make continuous changes to the operation of the freezer. It is preferred that changes to operating conditions of the freezer be made not more often than once every 1 second, preferably not more often than once every 100 seconds, and most preferably not more often than once every 300 seconds.

Compared to other techniques for determining actual temperature, a principal benefit of the present invention and its reliance on phase angle is that the parameters that are detected, determined and utilized in the present invention are independent of the mass, dimensions and size of the product whose exhibited phase angle is being determined, irrespective of whether the product is frozen or not. Below is an example of measuring the actual temperature of beef patties using the method outlined in this invention. For comparison. the instructions outlined in U.S. Pat. No. 5,189,366, were also followed to measure actual temperature of the product.

EXAMPLE

Beef patties (80% lean/20% fat), weighing 6 oz. and 0.5 inches thick, were utilized for this study. The beef patties were stored overnight in a temperature-controlled chamber. The temperature for the first experiment was set at 0° F. (almost fully frozen) and for the second at 35° F. (above freezing point). The temperatures of the patties were measured two ways, namely using a thermometer inserted into each patty, and using the water calorimetry method described hereinabove, to account for any potential internal temperature gradients. Then the patties were passed through a commercially available metal detector (Thermofisher APEX 500 High Performance), utilizing a field frequency of 300 KHz. The patties were arranged in different configurations to change the dimensions, size and shape of the product. The reactive (X) and resistive (R) signals were measured from the metal detector. The instructions of U.S. Pat. No. 5,189,366 were followed to determine the $$\frac{X}{R^\alpha}$$

ratio (where alpha was varied between 0.5 to 1). Also, the phase angle was calculated as per arctan $$\left(\frac{X}{R}\right).$$

following the current invention. The results and comparisons are shown in Table 1 below. At a temperature of 35° F. (unfrozen), both the methodologies of the U.S. Pat. No. 5,189,366 and the current invention provide a measure of temperature that is relatively independent of mass, shape and dimensions. However, at 0° F. (almost fully frozen), the $$\frac{X}{R^\alpha}$$

is highly dependent on mass, size and dimensions. On the other hand, at 0° F., the phase angle is independent of mass, size and dimensions.

In commercial patty freezing operations, 0° F. is the temperature to which most patties are frozen for long term storage. Thus 0° F. is a commercially relevant temperature. In most commercial continuous freezing applications, there are multiple patty forming lines that feed one freezer. Thus, there are multiple patties lined up along the width of the conveyor at the inlet and outlet of the freezer. If coils to establish the electromagnetic field are located at the outlet of the freezer to detect the actual temperature of the frozen patties, then multiple patties will enter the field at a given time. If one or more of the patty forming lines is not functioning due to breakdowns or another reason, which has been known to happen in commercial facilities, then the number of patties entering the freezer and the field will change. If the operator is using the method of U.S. Pat. No. 5,189,366, this change in the number of patties on the conveyor could be interpreted as a significant change in temperature of the product, due to the $$\frac{X}{R^\alpha}$$

ratio being so dependent on mass, size and dimensions of the product. However, the phase angle methodology of the current invention would not give the same error.

TABLE 1

| Temp | Product Piece Size (L"*W"*H") | X/(R^α) α = 0.5 | α = 0.6 | α = 0.7 | α = 0.8 | α = 0.9 | α = 1.0 | Phase angle = Arctangent (X/R) |
|---|---|---|---|---|---|---|---|---|
| 0° F. | 5*10*1 | 150.21 | 119.31 | 94.77 | 75.28 | 59.80 | 47.50 | 88.79 |
| | 5*5*2 | 112.83 | 90.58 | 72.71 | 58.37 | 46.85 | 37.61 | 88.48 |
| | 5*5*1 | 57.88 | 45.14 | 35.21 | 27.46 | 21.42 | 16.71 | 86.57 |
| | 5*10*0.5 | 88.25 | 72.65 | 59.80 | 49.23 | 40.52 | 33.36 | 88.28 |
| 35° F. | 5*10*1 | 5.93 | 2.57 | 1.12 | 0.48 | 0.21 | 0.09 | 5.20 |
| | 5*5*2 | 5.33 | 2.36 | 1.05 | 0.47 | 0.21 | 0.09 | 5.23 |
| | 5*5*1 | 3.42 | 1.56 | 0.71 | 0.32 | 0.15 | 0.07 | 3.85 |
| | 5*10*0.5 | 4.27 | 1.93 | 0.87 | 0.39 | 0.18 | 0.08 | 4.55 |

The methodology of the present invention can be utilized to ensure that product exits the apparatus 10 at an actual temperature that is at a desired value or that is within a desired range of actual temperature. In such applications, actual temperature of product exiting the apparatus 10 can be measured by any conventional technique, represented by 50 in FIG. 2, which can be a thermocouple or a thermometer or other temperature-measuring device. For example, if the product as it exits is at an actual temperature that is too high or too low, then the operator can simply adjust an operating condition in the apparatus 10 so that the actual temperature within the apparatus as determined using any of the methodologies described herein based on correlation with the product's phase angle is lowered, or raised, respectively.

The methodology of the present invention can also be implemented in a way that utilizes the correlation between actual temperature and phase angle, as described herein, but without specifically including a step in which actual temperature is determined. That is, a set point for operation of the apparatus in which the invention is practiced (such as the apparatus described with respect to FIG. 2) can be established based on the aforementioned correlation between actual temperature and phase angle, but the set point is an actual phase angle value; and then the adjustment of operating conditions of the apparatus is made in response to detection of differences between the phase angle set point and the measured phase angle.

In addition, just as the actual temperature or the degree of freezing of the product as it exits the apparatus 10 is a useful guide for whether the conditions within the apparatus 10 need to be adjusted, other physical characteristics of the product as it exits the apparatus 10 can be relied on instead. Examples of such other physical characteristics include the visual appearance of the product, the surface texture of the product, or the internal stickiness or viscosity of the product which can affect the processability of the product in subsequent processing steps. In such cases, the phase angle set point on which operation of the invention is based is the phase angle (defined and determined as described herein) being exhibited by a product which exhibits the desired characteristic(s) as it exits the apparatus. The operator can modify the operating conditions of the apparatus 10 to reach a desired state or condition of the product exiting apparatus 10, establish a corresponding phase angle exhibited by the product, and simply use that phase angle as the set point for the apparatus 10 including an acceptable range of variability for the phase angle.

What is claimed is:

1. A method of analyzing a product to determine its temperature, comprising:
    (a) providing a correlation of the actual temperature of a reference product having the composition of a product being analyzed, that is conductive, correlated with the phase angle exhibited by the reference product, at two or more different actual temperatures, wherein the phase angle exhibited by a given product is a function of a reactive signal of the given product and a resistive signal of the given product measured in an electromagnetic field of a given strength and frequency applied to the given product;
    (b) applying an electromagnetic field of said given strength and frequency to the product being analyzed, measuring the reactive signal and the resistive signal exhibited by the product being analyzed in said electromagnetic field at said given strength and frequency, and determining the phase angle exhibited by the product being analyzed from the measured reactive signal and resistive signal of the product being analyzed; and
    (c) determining the actual temperature of the product being analyzed from the phase angle determined in step (b) in accordance with said correlation.

2. The method of claim 1 wherein at least one of the temperatures at which the correlation is provided is a temperature at which the product being analyzed is partially or completely frozen.

3. The method of claim 1 wherein a plurality of pieces of product are analyzed by passing them through the electromagnetic field, wherein the pieces of product are arrayed in a column along a direction of passage of the pieces through the electromagnetic field and are spaced apart from one another in the column such that a piece of product does not enter the electromagnetic field until the piece immediately ahead of it in the column has exited from the electromagnetic field.

4. A method of analyzing a product to determine the degree of freezing of the product, comprising:
    (a) providing a correlation of the degree of freezing of a reference product having the composition of a product being analyzed, that is conductive, correlated with the phase angle exhibited by the reference product, at two or more different degrees of freezing, wherein the phase angle exhibited by a given product is a function of a reactive signal of the given product and a resistive signal of the given product measured in an electromagnetic field of a given strength and frequency applied to the given product;
    (b) applying an electromagnetic field of said given strength and frequency to the product being analyzed, measuring the reactive signal and the resistive signal exhibited by the product being analyzed in said electromagnetic field at said given strength and frequency, and determining the phase angle exhibited by the product being analyzed from the measured reactive signal and resistive signal of the product being analyzed; and (c) determining the degree of freezing of the product being analyzed from the phase angle determined in step (b) in accordance with said correlation.

5. The method of claim 4 wherein at least one of the temperatures at which the correlation is provided is a temperature at which the product is partially or completely frozen.

6. The method of claim 4 wherein a plurality of pieces of product are analyzed by passing them through the electromagnetic field, wherein the pieces of product are arrayed in a column along a direction of passage of the pieces through the electromagnetic field, and are separated from one another in the column such that a piece of product does not enter the electromagnetic field until the piece immediately ahead of it in the column has exited from the electromagnetic field.

7. A method of operating equipment that provides product which is at a temperature within a desired range as it exits the equipment, comprising:

(a) passing a product that is conductive into and through equipment which is capable of subjecting the product within the equipment to at least one adjustable operating condition that is capable of modifying the temperature of the product within the equipment;

(b) applying an electromagnetic field of a given strength and frequency to the product at one or more of (i) a location that is within the equipment or (ii) a location at which the product leaves the equipment or (iii) a location at which the product enters the equipment, measuring a reactive signal and a resistive signal exhibited by the product in the applied electromagnetic field, and determining the phase angle exhibited by the product wherein the phase angle exhibited by a given product is a function of the reactive signal of the given product and the resistive signal of the given product measured in an electromagnetic field of a given strength and frequency applied to the given product;

(c) determining the actual temperature of the product from the measured phase angle in accordance with a predetermined correlation at two or more different actual temperatures of the actual temperature of the product correlated with the phase angle exhibited by a product having the composition of the product being analyzed measured at said applied electromagnetic field of said given strength and frequency; and (d) when the difference between the actual temperature of the product determined in step (c) and a predetermined set point temperature of the product is more than a predetermined difference value, reducing said difference by adjusting at least one adjustable operating condition within the equipment to modify the temperature of the product in the equipment, so that the temperature of the product as it exits the equipment is within said desired range.

8. The method of claim 7 wherein the product is partially frozen as it exits the equipment.

9. The method of claim 7 wherein the product is completely frozen as it exits the equipment.

10. The method of claim 7 wherein a plurality of pieces of product are analyzed by passing them through the electromagnetic field, wherein the pieces of product are arrayed in a column along a direction of passage of the pieces through the electromagnetic field, and are spaced apart from one another in the column such that a piece of product does not enter the electromagnetic field until the piece immediately ahead of it in the column has exited from the electromagnetic field.

11. The method of claim 7 wherein the at least one adjustable operating condition is any of: the temperature of the gaseous atmosphere within the equipment, the rate at which the gaseous atmosphere is circulated within the equipment; the rate at which gaseous heat transfer medium is fed into the equipment; and the rate at which the product is passed through the equipment.

12. The method of claim 7 wherein liquid or gaseous coolant is applied to the product within the equipment to reduce the temperature of the product or to partially or completely freeze the product, and the at least one adjustable operating condition is any of: the rate at which the coolant is applied to the food product, and the temperature of the coolant that is applied to the product.

13. A method of operating equipment that provides product which is at a temperature within a desired range as it exits the equipment, comprising:

(a) passing a product that is conductive into and through equipment which is capable of subjecting the product within the equipment to at least one adjustable operating condition that is capable of modifying the temperature of the product within the equipment;

(b) applying an electromagnetic field of a given strength and frequency to the product at one or more of (i) a location that is within the equipment or (ii) a location at which the product leaves the equipment or (iii) a location at which the product enters the equipment, measuring a reactive signal and a resistive signal exhibited by the product in the applied electromagnetic field, and determining the phase angle exhibited by the product wherein the phase angle exhibited by a given product is a function of the reactive signal of the given product and the resistive signal of the given product measured in an electromagnetic field of a given strength and frequency applied to the given product;

(c) determining the difference between the phase angle exhibited by the product as measured in step (b) and a predetermined phase angle set point; and (d) when the difference measured in step (c) is more than a predetermined difference value, reducing said difference by adjusting at least one adjustable operating condition within the equipment to modify the temperature of the product in the equipment so that the temperature of the product as it exits the equipment is within said desired range.

14. The method of claim 13 wherein the product is partially frozen as it exits the equipment.

15. The method of claim 13 wherein the product is completely frozen as it exits the equipment.

16. The method of claim 13 wherein the at least one adjustable environmental condition is any of: the temperature of the gaseous atmosphere within the equipment, the rate at which the gaseous atmosphere is circulated within the equipment and the rate at which the product is passed through the equipment.

17. The method of claim 13 wherein liquid or gaseous coolant is applied to the product within the equipment to reduce the temperature of the product or to partially or completely freeze the product, and the at least one adjustable environmental condition is any of: the rate at which the coolant is applied to the food product, and the temperature of the coolant that is applied to the product.

18. The method of claim 13 wherein a plurality of pieces of product are analyzed by passing them through the electromagnetic field, wherein the pieces of product are arrayed in a column along a direction of passage of the pieces through the electromagnetic field, and are spaced apart from one another in the column such that a piece of product does not enter the electromagnetic field until the piece immediately ahead of it in the column has exited from the electromagnetic field.

19. The method of claim 13 wherein the predetermined phase angle set point is determined based on a desired actual temperature of the product and from a predetermined correlation at two or more different actual temperatures of a product of same composition as the product being passed through the equipment correlated with the phase angle of the product measured at said electromagnetic field of said given strength and frequency.

20. The method of claim 13 wherein the predetermined phase angle set point is determined based on a desired degree of freezing of the product and from a predetermined correlation at two or more different degrees of freezing of a product of same composition as the product being passed through the equipment correlated with the phase angle of the product measured at said electromagnetic field of said given strength and frequency.

21. The method of claim 13 wherein the predetermined phase angle set point is the phase angle exhibited by a reference product, of same composition as the product being passed through the equipment measured at said electromagnetic field of said given strength and frequency, which exhibits a desired specified physical characteristic as it exits the equipment.

22. A method of operating equipment that provides product which exhibits a degree of freezing that is within a desired range as the product exits the equipment, comprising:
(a) passing a product that is conductive into and through equipment which is capable of subjecting the product within the equipment to at least one adjustable operating condition that is capable of modifying the degree of freezing of the product within the equipment;
(b) applying an electromagnetic field of a given strength and frequency to the product at one or more of (i) a location that is within the equipment or (ii) a location at which the product leaves the equipment or (iii) a location at which the product enters the equipment, measuring a reactive signal and a resistive signal exhibited by the product in the applied electromagnetic field, and determining the phase angle exhibited by the product wherein the phase angle exhibited by a given product is a function of the reactive signal of the given product and the resistive signal of the given product measured in an electromagnetic field of a given strength and frequency applied to the given product;
(c) determining the degree of freezing of the product from the measured phase angle in accordance with a predetermined correlation at two or more different actual degrees of freezing of the actual temperature of the product correlated with the phase angle exhibited by a product having the composition of the product being analyzed measured at said applied electromagnetic field of said given strength and frequency; and
(d) when the difference between the degree of freezing of the product determined in step (c) and a predetermined set point degree of freezing of the product is more than a predetermined difference value, reducing said difference by adjusting at least one adjustable operating condition within the equipment to modify the degree of freezing of the product in the equipment so that the degree of freezing of the product as it exits the equipment is within said desired range.

23. The method of claim 22 wherein the product is partially frozen as it exits the equipment.

24. The method of claim 22 wherein the product is completely frozen as it exits the equipment.

25. The method of claim 22 wherein the at least one adjustable operating condition is any of: the temperature of the gaseous atmosphere within the equipment, the rate at which the gaseous atmosphere is circulated within the equipment; the rate at which gaseous heat transfer medium is fed into the equipment; and the rate at which the product is passed through the equipment.

26. The method of claim 22 wherein liquid or gaseous coolant is applied to the product within the equipment to reduce the temperature of the product or to partially or completely freeze the product, and the at least one adjustable environmental condition is any of: the rate at which the coolant is applied to the food product, and the temperature of the coolant that is applied to the product.

27. Equipment that is capable of modifying the temperature of product within the equipment, comprising:
a housing having a passageway extending through the housing from an entrance to an exit, and a transport assembly which is capable of moving product through the passageway from the entrance to the exit, and one or more outlets within the housing from which liquid or gaseous heat transfer medium can be passed into the passageway to establish an environment to which product within the housing is exposed, wherein at least one condition to which product within the housing is exposed is adjustable to modify the temperature of product within the passageway;
an electromagnetic field generator that is at one or more of (i) a location within the housing or (ii) a location at an exit from the housing or (iii) a location at an entrance into the housing, that is capable of applying an electromagnetic field to product,
a detector operatively connected to said electromagnetic field generator and that is capable of measuring a reactive signal exhibited by product in the electromagnetic field and a resistive signal exhibited by product in the electromagnetic field and of calculating therefrom the phase angle exhibited by the product;
a controller operatively connected to said detector and that is capable of one or both of (i) determining the difference between a predetermined set point phase angle exhibited by the product, and the phase angle exhibited by the product passing through the passageway thereof, and (ii) determining the difference between a predetermined degree of freezing of the product, and the degree of freezing of the product that corresponds to a calculated phase angle of the product in accordance with a predetermined correlation between the degree of freezing of a reference product of the same composition as the product being passed through the passageway and the phase angle thereof, and
an operational component operatively connected to said controller and that is capable of adjusting at least one operating condition to which the product is exposed within the housing to reduce said difference in response to said difference.

28. Equipment according to claim 27 that is capable of cooling product within the equipment, wherein liquid or gaseous coolant can be passed into the passageway from said one or more outlets, and the operational component is capable of adjusting at least one operating condition within the housing to cool the product within the housing.

29. Equipment that is capable of modifying the degree of freezing of product within the equipment, comprising:
   a housing having a passageway extending through the housing from an entrance to an exit, and a transport assembly which is capable of moving product through the passageway from the entrance to the exit, and one or more outlets within the housing from which liquid or gaseous heat transfer medium can be passed into the passageway to establish an environment to which product within the housing is exposed, wherein at least one condition to which product within the housing is exposed is adjustable to modify the degree of freezing of product within the passageway;
   an electromagnetic field generator within the housing and/or at an exit from the housing and/or at an entrance into the housing, that is capable of applying an electromagnetic field to product,
   a detector that is capable of measuring a reactive signal exhibited by product in the electromagnetic field and a resistive signal exhibited by product in the electromagnetic field and of calculating therefrom the phase angle exhibited by the product;
   a controller that is capable of determining the difference between a predetermined degree of freezing of the product, and the degree of freezing of the product that corresponds to a calculated phase angle of the product in accordance with a predetermined correlation between the degree of freezing of a reference product of the same composition as the product being passed through the passageway and the phase angle thereof, and;
   an operational component that is capable of adjusting at least one operating condition to which the product is exposed within the housing to reduce said difference in response to said difference.

30. Equipment according to claim 29 that is capable of cooling product within the equipment, wherein liquid or gaseous coolant can be passed into the passageway from said one or more outlets, and the operational component is capable of adjusting at least one operating condition within the housing to cool the product within the housing.

31. A method of operating equipment that provides product which exhibits a selected physical characteristic within a desired range as it exits the equipment, comprising:
   (a) passing a product that is conductive into and through equipment which is capable of subjecting the product within the equipment to at least one adjustable operating condition that is capable of modifying the selected physical characteristic of the product within the equipment;
   (b) applying an electromagnetic field of a given strength and frequency to the product at one or more of (i) a location that is within the equipment or (ii) a location at which the product leaves the equipment or (iii) a location at which the product enters the equipment, measuring a reactive signal and a resistive signal exhibited by the product in the applied electromagnetic field, and determining the phase angle exhibited by the product wherein the phase angle exhibited by a given product is a function of the reactive signal of the given product and the resistive signal of the given product measured in an electromagnetic field of a given strength and frequency applied to the given product;
   (c) determining the difference between the phase angle exhibited by the product as measured in step (b) and a predetermined phase angle set point that corresponds to a desired value of the selected physical characteristic; and
   (d) when the difference measured in step (c) is more than a predetermined difference value, reducing said difference by adjusting at least one adjustable operating condition within the equipment to modify the selected physical characteristic of the product in the equipment so that the selected physical characteristic of the product as it exits the equipment is within said desired range.

32. The method of claim 31 wherein the at least one adjustable environmental condition is any of: the temperature of the gaseous atmosphere within the equipment, the rate at which the gaseous atmosphere is circulated within the equipment and the rate at which the product is passed through the equipment.

33. The method of claim 31 wherein the predetermined phase angle set point is determined based on a desired value of the selected physical characteristic and from a predetermined correlation at two or more different desired values of the selected physical characteristic of a product of same composition as the product being passed through the equipment correlated with the phase angle of the product measured at said electromagnetic field of said given strength and frequency.

34. Equipment that is capable of modifying the selected characteristics of product within the equipment, comprising:
   a housing having a passageway extending through the housing from an entrance to an exit, and a transport assembly which is capable of moving product through the passageway from the entrance to the exit, and one or more outlets within the housing from which liquid or gaseous heat transfer medium can be passed into the passageway to establish an environment to which product within the housing is exposed, wherein at least one condition to which product within the housing is exposed is adjustable to modify the selected characteristics of product within the passageway;
   an electromagnetic field generator that is at one or more of (i) a location within the housing or (ii) a location at an exit from the housing or (iii) a location at an entrance into the housing, that is capable of applying an electromagnetic field to product,
   a detector operatively connected to said electromagnetic field generator and that is capable of measuring a reactive signal exhibited by product in the electromagnetic field and a resistive signal exhibited by product in the electromagnetic field and of calculating therefrom the phase angle exhibited by the product;
   a controller operatively connected to said detector and that is capable of determining the difference between a predetermined set point phase angle that corresponds to a desired value of the selected physical characteristic, and the phase angle exhibited by the product passing through the passageway thereof, and
   an operational component operatively connected to said controller and that is capable of adjusting at least one operating condition to which the product is exposed within the housing to reduce said difference in response to said difference.

35. Equipment according to claim 34 that is capable of cooling product within the equipment, wherein liquid or gaseous coolant can be passed into the passageway from said one or more outlets, and the operational component is capable of adjusting at least one operating condition within the housing to cool the product within the housing.

\* \* \* \* \*